(12) United States Patent
Schantz et al.

(10) Patent No.: US 8,140,655 B1
(45) Date of Patent: Mar. 20, 2012

(54) DYNAMIC ENCLAVE COMPUTING SYSTEM

(75) Inventors: Howard J. Schantz, Inver Grove Heights, MN (US); Stephen M. Sohn, Shoreview, MN (US); Brent C. Anderson, Golden Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 200 days.

(21) Appl. No.: 12/467,392

(22) Filed: May 18, 2009

(51) Int. Cl.
*G06F 15/173* (2006.01)
(52) U.S. Cl. .................... 709/223; 709/224; 709/226
(58) Field of Classification Search .............. 709/224
See application file for complete search history.

(56) References Cited

U.S. PATENT DOCUMENTS

| | | | |
|---|---|---|---|
| 7,458,082 B1 * | 11/2008 | Slaughter et al. | 719/328 |
| 2003/0016644 A1 * | 1/2003 | Kuster et al. | 370/337 |
| 2005/0240621 A1 * | 10/2005 | Robertson et al. | 707/102 |
| 2007/0143465 A1 * | 6/2007 | Gonzalez et al. | 709/223 |
| 2008/0147992 A1 * | 6/2008 | Raikin et al. | 711/146 |
| 2009/0037585 A1 * | 2/2009 | Miloushev et al. | 709/226 |
| 2009/0049443 A1 * | 2/2009 | Powers et al. | 718/100 |

* cited by examiner

*Primary Examiner* — Kevin Bates
*Assistant Examiner* — Tom Y Chang
(74) *Attorney, Agent, or Firm* — Hamre, Schumann, Mueller & Larson, P.C.

(57) ABSTRACT

A computing architecture and method which provides application software or hardware the ability to dynamically allocate subsystem resources to construct computing enclaves. The architecture manages the configuration of and controls access to the subsystem resources. Subsystem resources are assigned to enclaves and additional subsystem resources are able to be added or removed as needs fluctuate. Removed subsystem resources are sanitized and returned to a resource pool, and are available for allocation. This computing architecture and method allows the creation of dynamic computing systems.

24 Claims, 7 Drawing Sheets

Generic Processor Definition

```
// Dynamic Enclave Computing Environment (DECE) processor device
//
//
// import          java.beans.*;
import          java.net.*;

// A processor is a computational device containing cache,
// main memory, ALU, data buses, and peripheral controllers
// public class Processor {
    static final String version = "1.00.00";

URL     Name = Device.DEFAULT_URL,
    int     state = Device.CLEAN,
            allocated = Device.FREE,
            enclave = Device.FREE_POOL,
            operatingSystem = Device.WIN_2008_SERVER,
            architecture = Device.x86;
    long    cache = 1000000000,
            ram = 2000000000;

void joinComputation () {
            // Code for joining processor to application code
            // goes here
    }
}
```

FIG. 4b

Processor Request Routine

```java
// Dynamic Enclave Computing Environment (DECE) allocation example
//
//
// import          java.beans.*;
import          java.net.*;

// Allocate a processor to join the computation
// public class Allocate { public static void main(String[] args ) {

Processor              p;
        Enclave freePool = new      Enclave(Device.FREE_POOL);

try {
            // Ask the free pool for one additional x86 processor
            // with at least 6 MB of RAM to be added to this
            // allocation unit
            //
            p = freePool.requestProcessor(1,        // Quantity
                Device.PHYSICAL,                    // Physical or virtual
                Device.x86,                         // Architecture
                6000000);                           // Minimum RAM
            p.joinComputation();
        } catch (Exception e) {
            System.err.println(e);
        }
        // Application code begins here...
        //
    }
}
```

DYNAMIC ENCLAVE COMPUTING SYSTEM

FIELD

The disclosure relates to a dynamic enclave computing system where the computing architecture of the system provides the application software or hardware with the ability to dynamically allocate, release, or isolate the subsystem resources.

BACKGROUND

In today's computing system, a physical network or enclave is a system of devices that communicate via cabling, modems, routers, or other hardware. The devices are physically connected to a cable plant to form an enclave and are managed independently of any other enclave with a distinct separation of responsibilities and different rules in each. Each enclave is seen as a private area where information is not openly shared with other enclaves and is isolated from other enclaves. In order to share or reassign computing devices between enclaves, the device must be manually unplugged from a network switch of an enclave and then manually plugged into a network switch of a different enclave.

Figure 1:
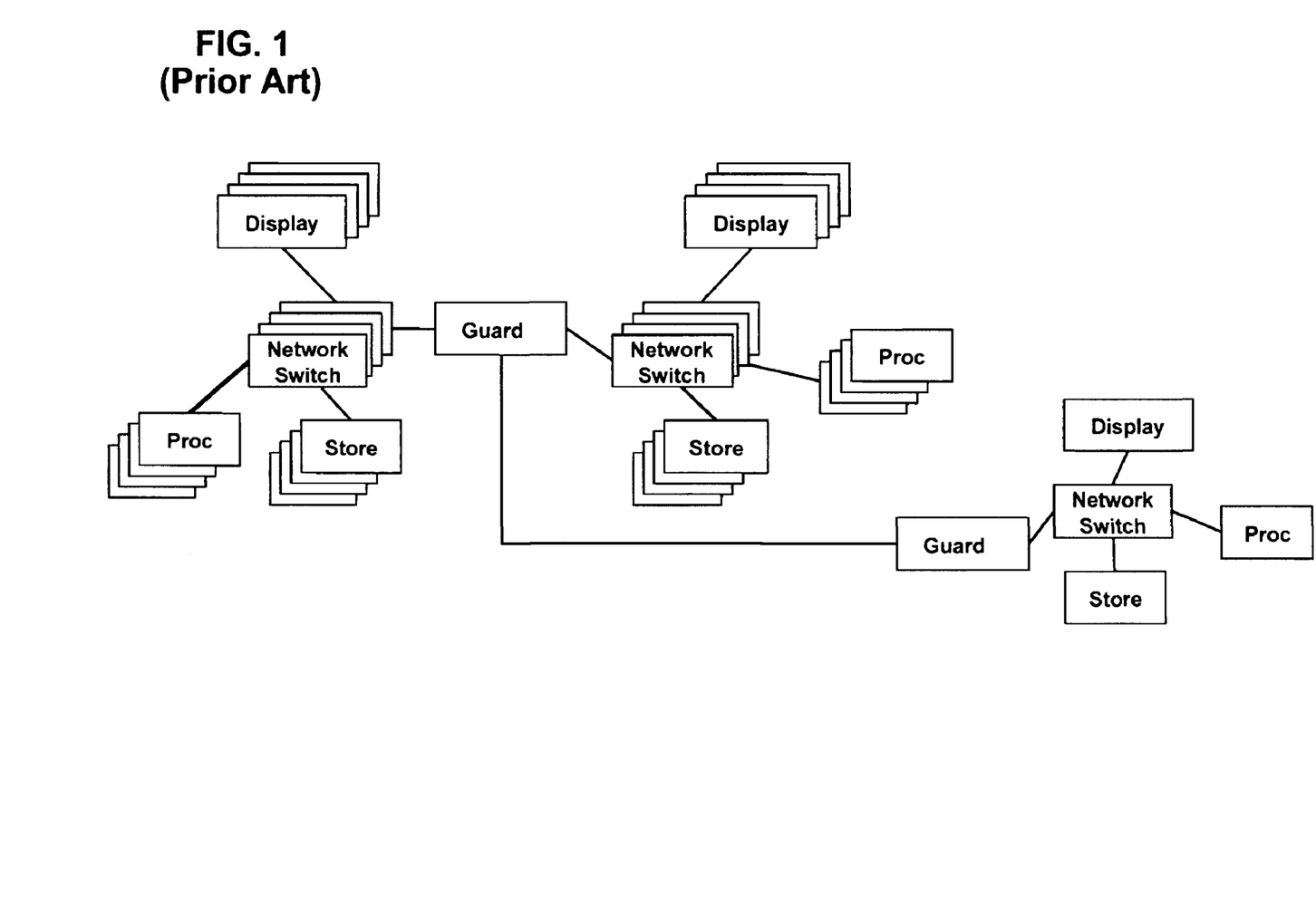
FIG. 1 is a diagrammatic view of a prior art of computing architecture.

As shown in FIG. 1, some physical networks may include, for example, more than one enclave or form part of an extended network which incorporates one or more enclaves, whose network switches are linked to each other through a guard or firewall. The guard is in place to control the protocol rules and to filter certain traffic between the systems. For example, in an office system, the human resources department and the accounting department share the same extended network which contains general computing functions, but each department has their own enclave that is isolated from other enclaves. Therefore, the accounting department does not have access to the human resource enclave which contains personal information regarding the employees. Additionally, the processors in the human resources department are not available for the accounting departments use and are not able to be reassigned to the accounting department without physically unplugging and moving the processors.

The problem is that without physical manipulation, the devices cannot be allocated to other enclaves. For example, in the event that an enclave needs additional processing capabilities, it cannot "borrow" another processor temporarily or permanently without physical manipulation. Also, the information on the processor may need to be sanitized, by a user, so that private or secret information from one department is not available to another department. The solution is a computing architecture that interacts through software to interface with the enclaves in order to dynamically allocate subsystem resources. By doing this, "borrowing" of the processor could be accomplished electronically, without user knowledge or interface, and appears seamless. Then, once the processor is no longer needed, it is sanitized by computing architecture and returned to the processor pool for the next user.

SUMMARY

A computing architecture and method which provides application software or hardware the ability to dynamically allocate subsystem resources to construct computing enclaves. The architecture manages the configuration of and controls access to the subsystem resources. Subsystem resources are assigned to enclaves and additional subsystem resources are able to be added or removed as needs fluctuate. Removed subsystem resources are sanitized and returned to a resource pool, and are available for allocation. This computing architecture and method allows the creation of dynamic computing systems.

Dynamic computing systems are advantageous in that allocation of subsystem resources is done without the physical or manual manipulation of the subsystem resources. This architecture driven allocation is less time consuming than the physical act of unplugging and plugging in a subsystem resource or a user inputting data. There is no need for a user to verify that the subsystem resource is free and available and that it is sanitized for use. Another advantage is that more processes are able to be run with fewer separate subsystem resources. Additionally, the space required to house the various subsystem resources is reduced.

Applications of a dynamic computing system include public and private entities. Example applications of a dynamic computing system include, but are not limited to: space constrained systems, where subsystem resources need to be shared amongst several software applications; applications which require resources to be reconfigured or redistributed during the mission; distributed computing systems; and ad hoc computing systems. Users could consist of commercial or public enterprises, for example, such as businesses involved in processing of payroll, insurance companies, accounting firms, private security, police and fire departments, Department of Defense, and the military. In essence, users of a dynamic computing system could comprise any entity that may require more than one user system.

One example of a system implementing a dynamic computing enclave comprises, a configuration policy manager and controller (CPMC), a physical layer switch (PLS), and at least one or, for example, a plurality of subsystem resources. The CPMC is linked to and manages and controls the PLS. The PLS is linked to the subsystem resources. The CPMC is configured and arranged to be able to allocate at least one of the subsystem resources to a requesting computing enclave via the PLS.

One advantage of the dynamic nature of the computing infrastructure allows for better resource sharing. In space constrained systems, such as a Navy surface ship or submarine, subsystem resources may need to be shared amongst several software applications during the mission but the information contained within those resources are not to be shared.

An additional advantage of the dynamic enclave computing system allows for switching at a physical layer of network stack, which is protocol independent. It also allows for application software to allocate (and free) resources. Therefore, the potential is higher to get certified for DoD platform applications that require virtual local area network (VLAN).

DETAILED DESCRIPTION

A computing architecture and method which provides application software or hardware the ability to dynamically allocate subsystem resources to construct computing enclaves. The architecture manages the configuration of and controls access to the subsystem resources. Subsystem resources are assigned to enclaves and additional subsystem resources are able to be added or removed as needs fluctuate. Removed subsystem resources are sanitized and returned to a resource pool, and are available for allocation. This computing architecture and method allows the creation of dynamic computing systems.

Figure 2:
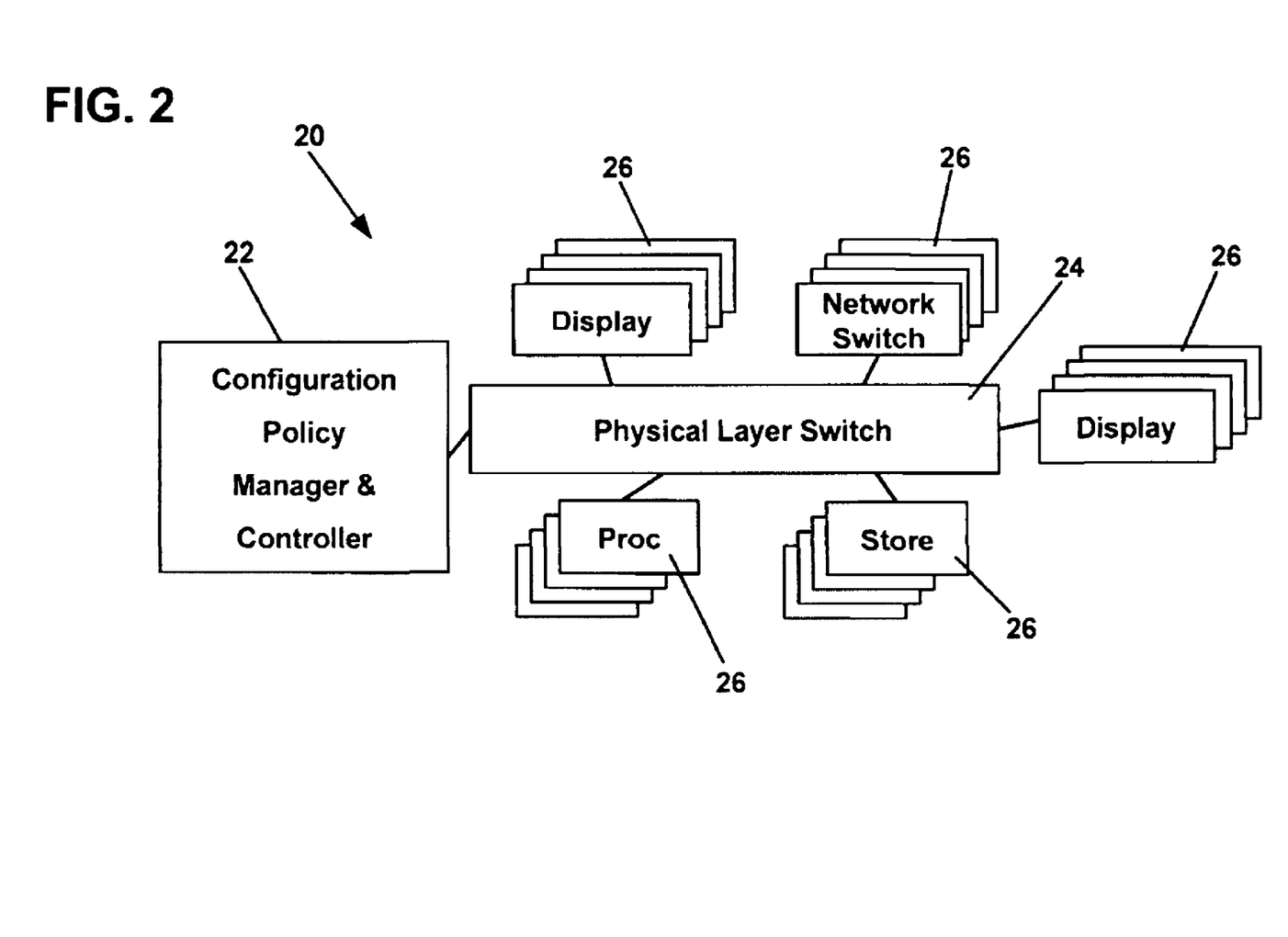
FIG. 2 is a diagrammatic view of the new computing architecture approach.

Referring to FIG. 2, a dynamic enclave computing system 20 may contain a configuration policy manager and controller (CPMC) 22, a physical layer switch (PLS) 24, and a plurality of subsystem resources 26.

This application refers to a computing system and is intended to broadly cover the class of hardware architectures and software used for computing. Computing is the activity of using computer technology, computer hardware and software. For example, the computing system is able to be comprised of some sort of network, regardless of whether that network is printed onto a circuit board or made up of linked devices and cables. And the computing system processes are able to be interconnected via some sort of communication system, comprising equipment or cabling. However, this application is also intended to encompass computer hardware architecture and software that is non-computing, i.e. does not perform mathematical and logical operations on data according to programmed instructions in order to obtain the required information.

Computing is defined to mean activities requiring or benefiting from computers. Thus, computing includes hardware and software systems for the purposes of, for example, processing, structuring, and managing various kinds of information, doing scientific studies using computers, making computer systems behave intelligently, creating and using communications and entertainment media, finding and gathering information relevant to any particular purpose, and so on.

The CPMC 22 is a computing device that controls and manages the dynamic enclave computing system 20. The CPMC 22 is responsible for managing and controlling the PLS 24 and controlling the subsystem resources 26 access to the PLS 24, thereby managing the configuration of the subsystem resources 26.

The CPMC 22 is linked to the PLS 24, and the link is accomplished by a wired connection or a wireless connection. The wired connection may include, for example, fiber optic, coaxial, or twisted pair structured cabling. The wireless connection may include, for example, infrared radiation, microwave, or radio waves through a medium like air and may include, for example, narrowband, broadband, or circuit/packet data. However, any type of connection to link the CPMC 22 and the PLS 24 so that they can communicate can be used.

The PLS 24 is a known technology, and is used to provide connectivity between the various subsystem resources 26 and the CPMC 22. The PLS 24 acts like an electronic patch panel in that it makes it possible to interconnect different or same network types and devices. The PLS 24 is protocol independent and does not inspect incoming traffic or make routing decisions. Therefore, the subsystem resources 26 are able to be reconfigured electronically, per software controls from the CPCM 22, without the manual effort of unplugging and plugging in a subsystem resource 26 or manually reassigning, per user input of data, a subsystem resource 26. An example of a PLS 24 is the APCON IntellaPatch™ 32 Physical Layer Switch, available from APCON, Inc. located in Wilsonville, Oreg.

The subsystem resources 26 comprise any component that can be attached to a computing network including, but not limited to, processors, displays, network switches, storage devices, guards, printers, servers, scanners, voice over IP systems, workstations, personal computers, etc. The subsystem resources 26 are linked to the PLS 24 via a wired connection or a wireless connection. The wired connection may include, for example, fiber optic, coaxial, or twisted pair structured cabling. The wireless connection may include, for example, infrared radiation, microwave, or radio waves through a medium like air and may include, for example, narrowband, broadband, or circuit/packet data. However, any type of connection to link the PLS 24 and the subsystem resources 26 so that they can communicate can be used.

For example, as shown in FIG. 2 one type of subsystem resource 26 can be a processor. A processor is an electronic circuit that can execute computer programs and are made for one or many purposes. This includes, but is not limited to, central processing units (CPU) and microprocessors. FIG. 2 shows four processors but there can be any number or no processors in the dynamic enclave computing system 20.

Another type of subsystem resource 26 can be a network switch. A network switch can be a networking device that connects network segments. A network switch can be manually, electrically or electronically operated. Network switches may include, but not be limited to ethernet switches, routers, hubs, repeaters, and network bridges. FIG. 2 shows four network switches but there can be any number or no network switches in the dynamic enclave computing system 20.

Another type of subsystem resource 26 can be a storage device. A storage device is any device for recording or storing information or data. A storage device may hold information, process information, or both. Storage devices include, but are not limited to, random access memory (RAM), optical disks, floppy disks, USB flash drives, hard disk drives, magnetic tape, film, punch cards, and video tapes. FIG. 2 shows four storage devices but there can be any number or no storage devices in the dynamic enclave computing system 20.

Another type of subsystem resource 26 can be a display. A display is any device that can show images or information. Displays include, but are not limited to, computer monitors, workstations, personal computers, LCD monitors, plasma displays, television sets, light emitting diodes (LED), video projectors, and lights. FIG. 2 shows four displays but there can be any number or no displays in the dynamic enclave computing system 20.

Another type of subsystem resource 26 can be a guard. Guards are protection devices used within networks to provide a level of access control between different sub-networks within the network. The primary purpose of a guard is to control access to and from the sub-network from and to the outside network. Guards can be implemented in both hardware and software, or a combination of both. Guards are configured to permit, deny, encrypt, decrypt, or proxy all computer traffic between different enclave domains based upon a set of rules and other criteria. FIG. 2 shows four guards but there can be any number or no guards in the dynamic enclave computing system 20.

FIG. 2 shows an example of a dynamic enclave computing system 20 and is shown to include a plurality of subsystem resources 26 linked to a common PLS 24. As shown, each type of subsystem resource 26 could be comprised of a plurality of that type of resource. However, each type of subsystem resource 26 could be none or any number of subsystem resources 26.

As the computing device, the CPMC 22 controls and manages the dynamic enclave computing system 20 and creates enclaves. As such, the CPMC 22 interacts with the PLS 24 to interface with the subsystem resource 26 in order to allocate at least one subsystem resource 26 into at least one enclave.

Figure 3:
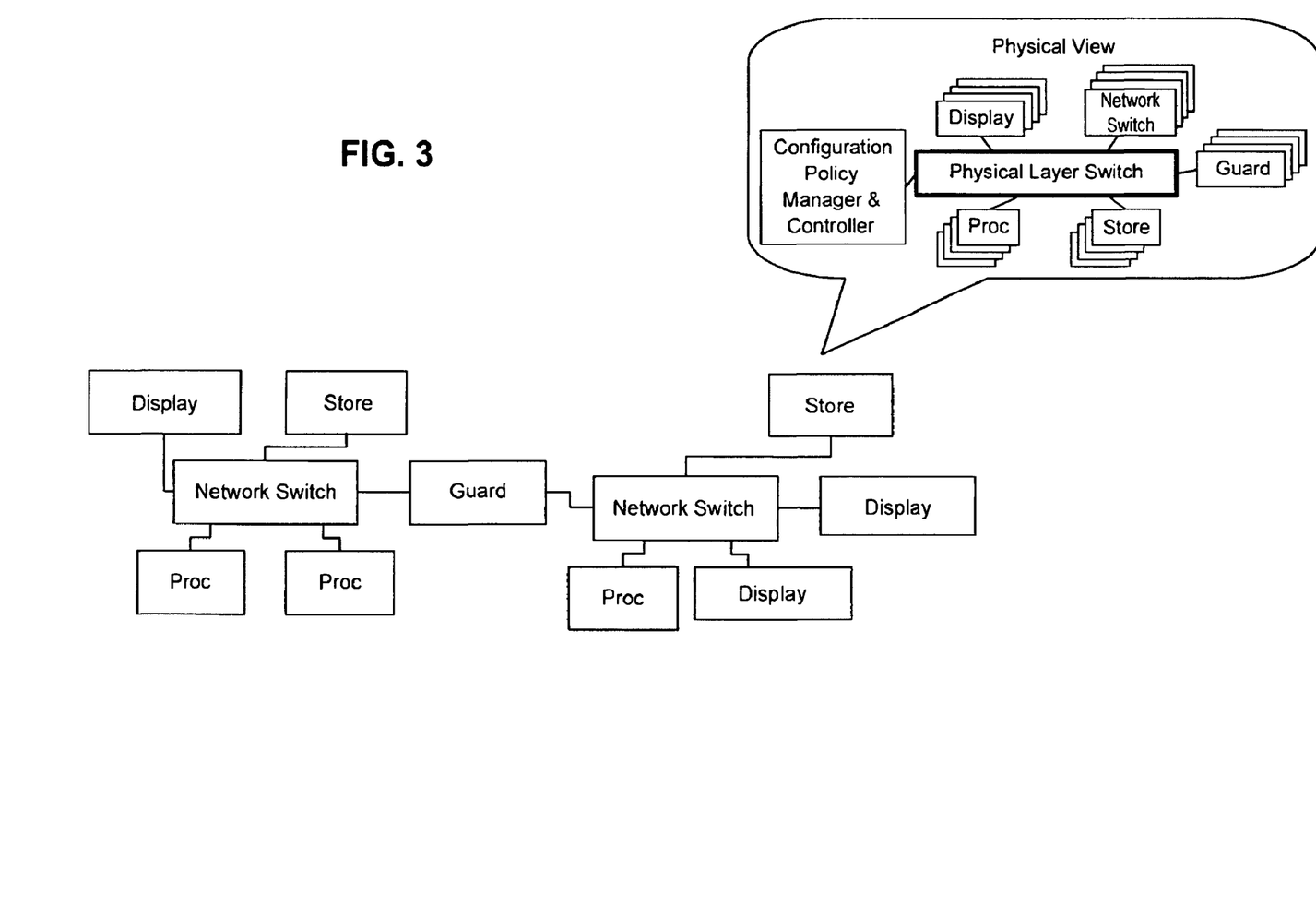
FIG. 3 is a diagrammatic view of an exemplary system of two enclaves configured by using the new computing architecture.

As shown in FIG. 3, example enclaves 32, 34 are comprised of at least one subsystem resource. The enclave can also be referred to as a domain or "community of interest". Functionally, an enclave may be isolated, maintained separate, or private, from other enclaves and may be allocated to perform specific processing activities or be allocated to specific computing groups. An enclave's information may be kept private and not shared with other enclaves. Another example may allow for sharing of information, in whole or in part, between enclaves. Additionally, enclaves may be configured as a subsystem resource 26 and allocated to a separate enclave.

As shown in FIG. 3, the example enclave 32 is comprised of one display, one storage device, one network switch, and two processors while example enclave 34 is comprised of two displays, one storage device, one network switch, and one processor. An example of an enclave with one subsystem resource 26 could be an enclave that is comprised of one processor. An exemplary dynamic enclave computing system 20 could be comprised of a plurality of enclaves, each enclave including at least one subsystem resource 26.

The dynamic enclave computing system 20 can be comprised, for example, of at least one enclave or a plurality of enclaves, each enclave comprised of at least one subsystem resource 26 or a plurality of subsystem resources 26. Additionally, each type of subsystem resource 26 is able to be comprised of at least one or a plurality of that type of subsystem resource 26.

Referring to FIG. 3, this is an example of how the CPMC 22, via the PLS 24, allocates the subsystem resources 26 into two enclaves 32, 34 so that the function of the dynamic enclave computing system 20 mimics the topology of a classical partitioned system 30. For example, in FIG. 3, the CPMC 22 allocates the subsystem resources 26 to function as the topology of a partitioned system 30 comprised of at least two enclaves 32, 34 networked with a guard 36 to enforce the cross-enclave aspect. Physically, the dynamic enclave computing system 20 retains the structure as shown in the physical view of FIG. 3 but, functionally, it performs like a classical partitioned system 30.

In the dynamic enclave computing system, the CPMC 22 sends messages using application software to instruct the PLS to group computing resources into enclaves. The CPMC 22 has knowledge, by function modules, of all subsystem resources 26, where each subsystem resource 26 is allocated and whether the subsystem resource 26 is in use or is available. The CPMC 22 is able to arrange the subsystem resources 26 into enclaves and is able to add or reduce subsystem resources 26 to the enclaves as needed.

Figure 5:
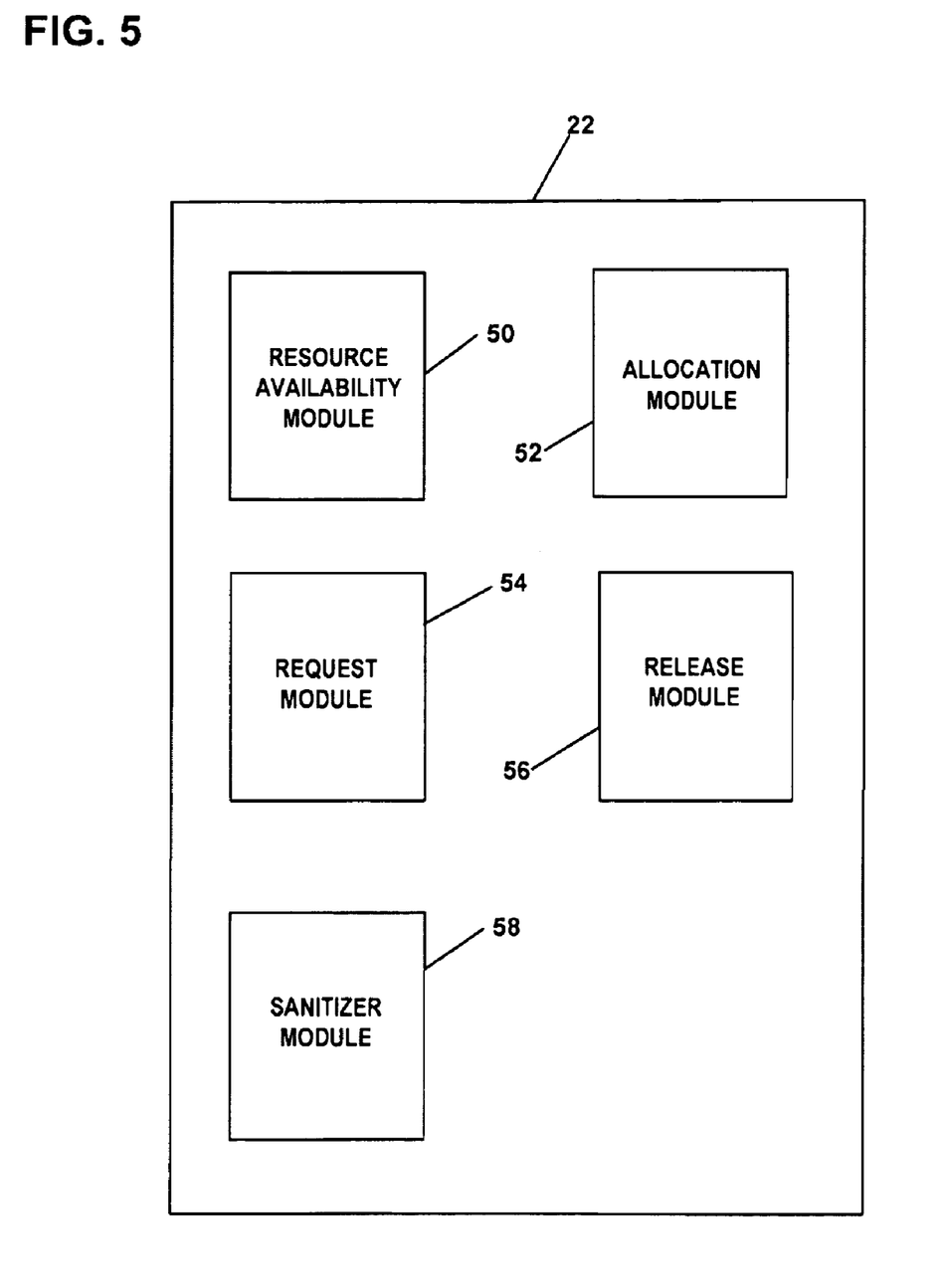
FIG. 5 is a diagrammatic view of the configuration policy manager and controller function modules.

Referring to FIG. 5, the CPMC 22 is comprised of a plurality of function modules. The modules can be implemented either by hardware or by software. For example, the modules may be comprised of a resource availability module 50, an allocation module 52, a request module 54, a release module 56, and a sanitizer module 58. The communication framework of the modules could be protocol and software language independent. An exemplary communication framework uses object-orientated programming languages.

Figure 4A:
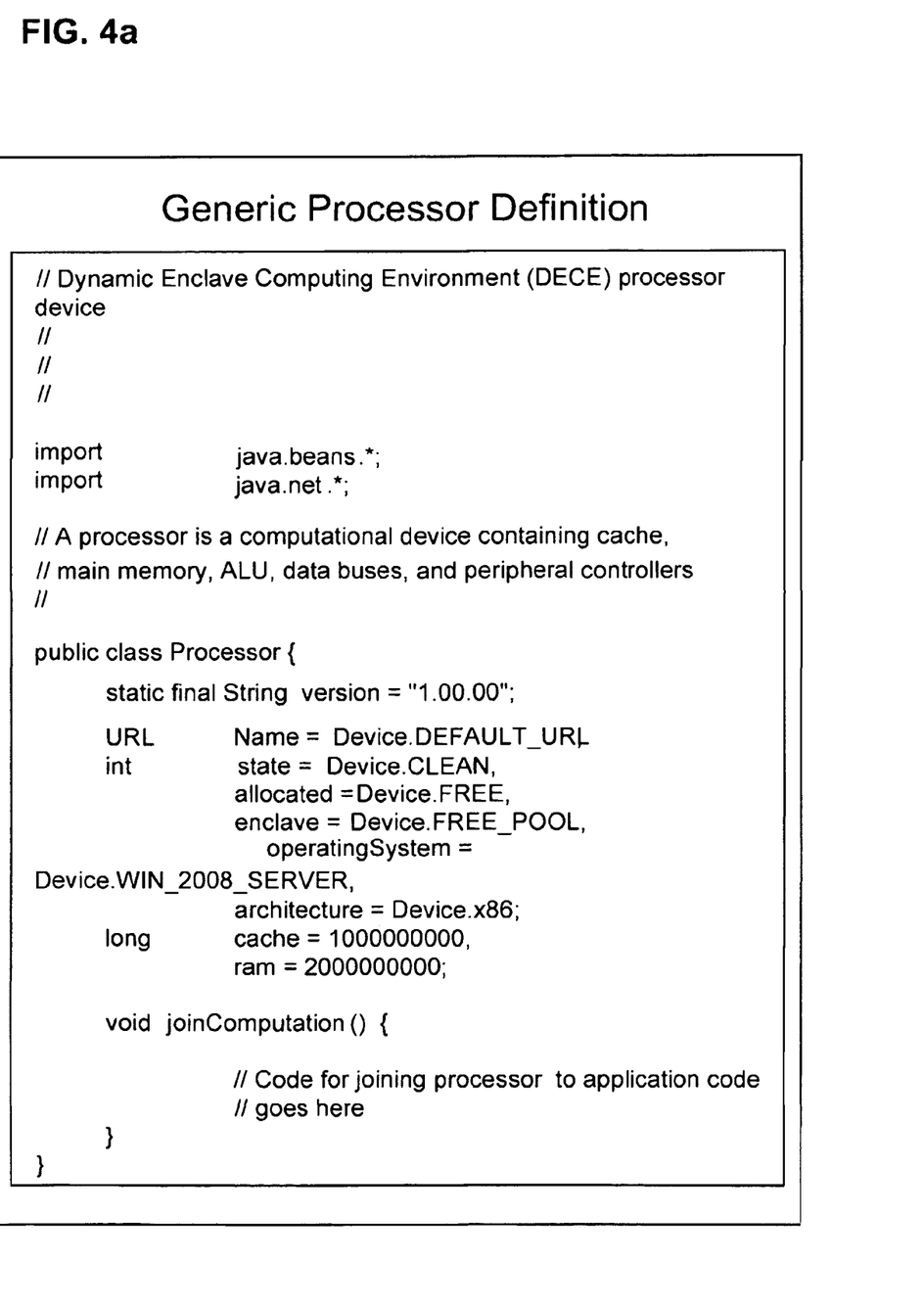
FIG. 4a is an example Java object-orientated definition for a generic processor resource.

The resource availability module 50 monitors and maintains the status of the subsystem resources 26. The resource availability module 50 has knowledge of which subsystem resources 26 are available for assignment to enclaves and, upon a request, hands the subsystem resource over to the allocation module 52. FIG. 4a is an example of an object-orientated definition for a generic processor using Java programming language. The generic processor definition from FIG. 4a is used by the resource availability routine. The resource availability module 50 runs the resource availability routine to maintain the status of a processor which is queued in the resource pool. The routine defines the class of processor, the name of the processor, the state of the processor, whether the processor is allocated or free, and where it is located.

Figure 4B:
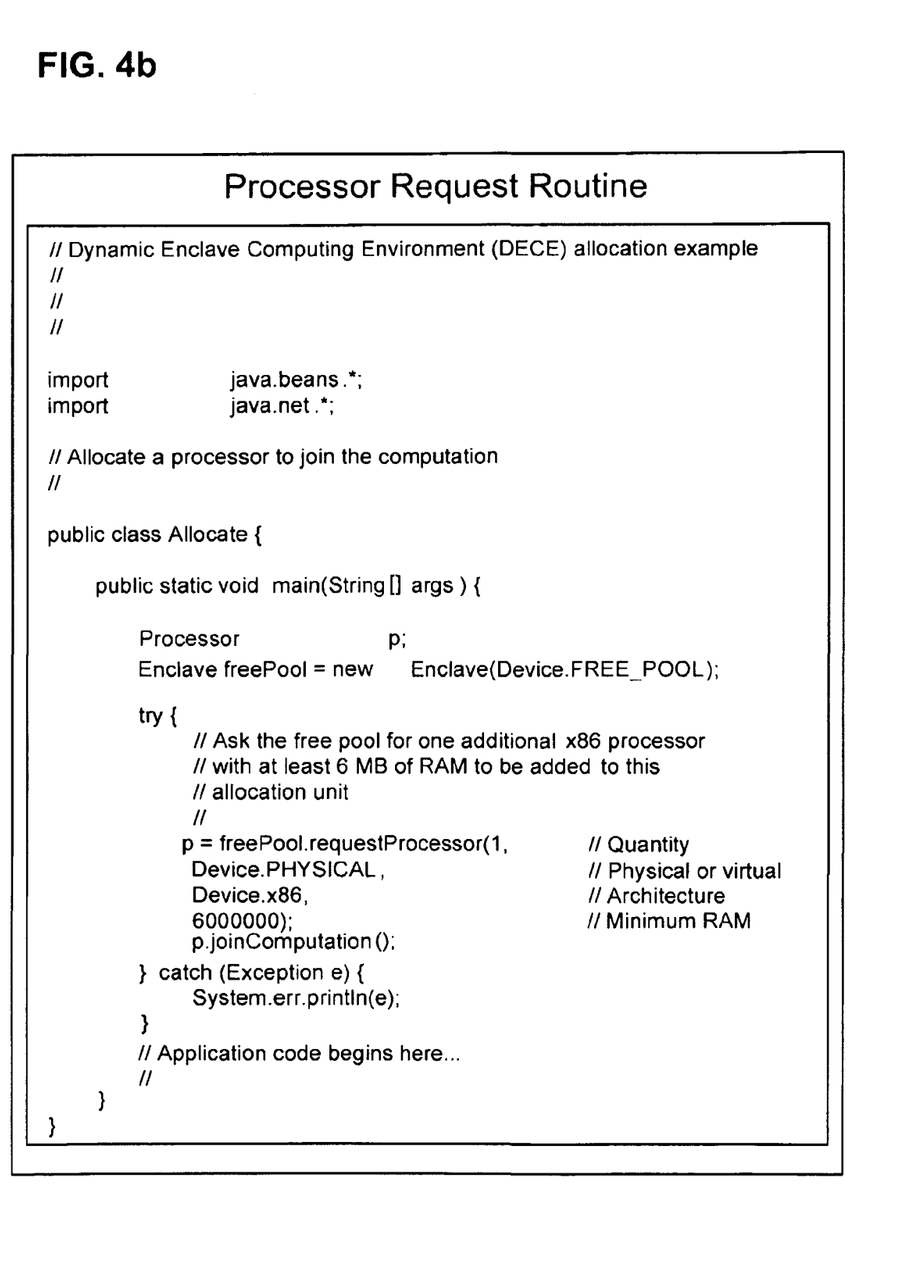
FIG. 4b is an example Java object-orientated algorithm that can be used in requesting processor resources for the system.

The request module 54 is in communication with the enclave. The enclave sends its request for additional subsystem resources 26 to the request module 54. The request module 54 analyzes the request and communicates the request to the resource availability module 50. FIG. 4b is an example of an object-orientated request routine, using Java programming language. The request module 54 runs the program for the request of the allocation of a processor to an enclave. After receiving the request for a processor, the request module 54 queries the resource availability module 50 for a processor stating, for example, the type of processor and memory required.

The allocation module 52 performs the function of allocating a subsystem resource 26 to a requesting enclave. The allocation module 52 receives the subsystem resource 26 from the resource availability module 50, verifies that the subsystem resource 26 is as requested and moves the subsystem resource 26 into the enclave.

The release module 56 monitors the enclave during the time that the enclave is using the subsystem resource 26. When the enclave no longer requires the subsystem resource 26, the enclave communicates to the release module 56 that the resource can be released back to the resource pool. The release module 56 takes control of the subsystem resource 26 at this time.

The sanitizer module 58 communicates with the release module 56. The sanitizer module accepts the subsystem resource 26 from the release module 56 and sanitizes the subsystem resource 26. Sanitization may include, for example, erasing data from memory components, uninstalling programs, setting values to zero, etc. Upon completion of sanitization, the sanitizer module 58 hands the subsystem resource 26 to the resource availability module 50 thereby returning the subsystem resource 26 to the resource pool.

Figure 6:
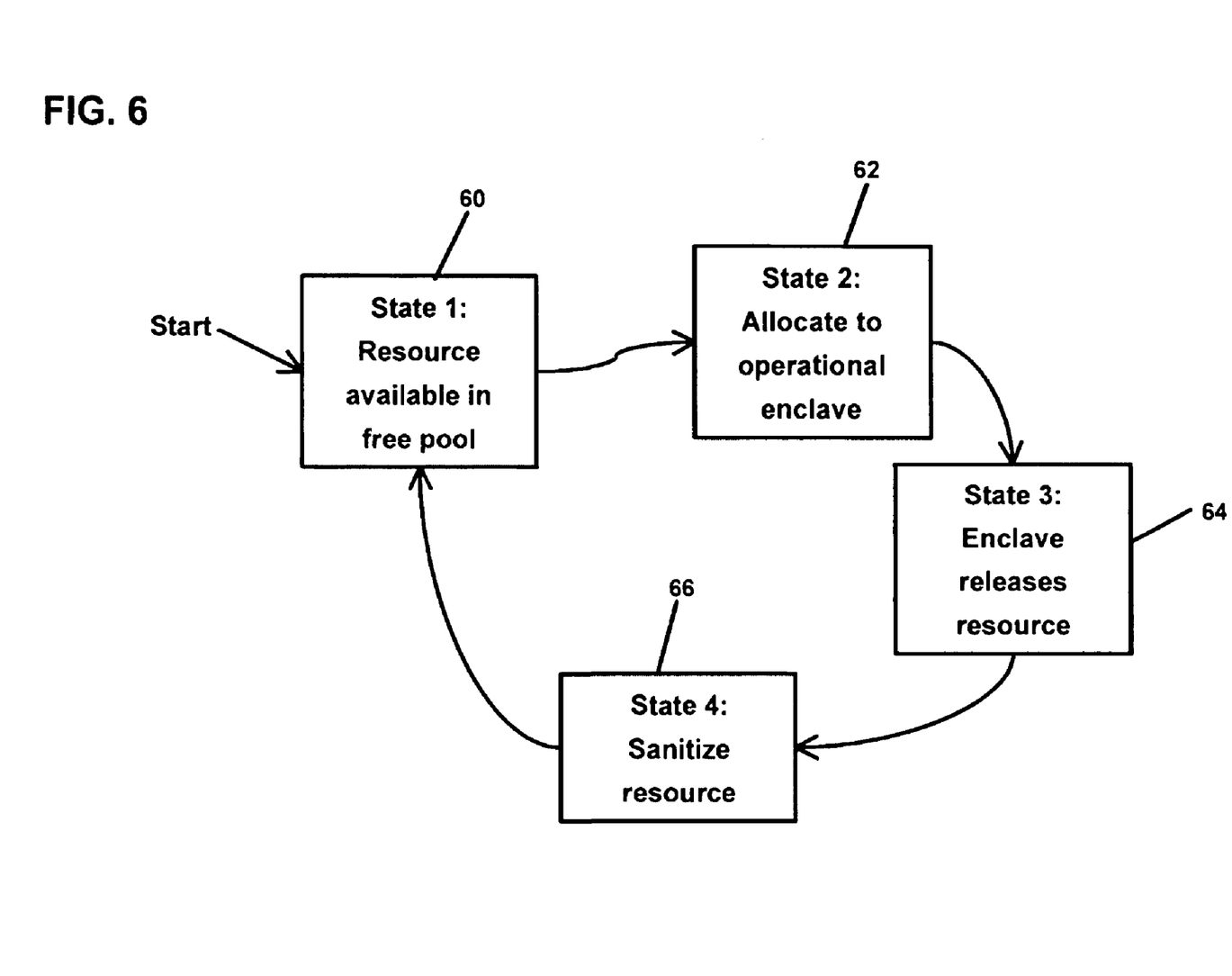
FIG. 6 is a diagrammatic view of the exemplary method of the process of resource allocation and return to the resource pool by the configuration policy manager and controller.

An example of the allocation and return process is shown in FIG. 6. The resource availability module 50 looks to all available resources in the free pool 60, and upon receipt of a request for a subsystem resource 26, allocates 62 the subsystem resource 26 to the enclave, all the while maintaining security of the subsystem resource 26 and enclave information. The subsystem resource 26 is used by the requesting enclave. During this time, the release module 56 is monitoring the enclave. Once the additional subsystem resource 26 is no longer needed by the enclave, the subsystem resource 26 is released by the enclave 64. The sanitizer module 58 receives and sanitizes 66 the subsystem resource 26. The subsystem resource 26 is then returned to the pool of available resources 60 and is available to be assigned to the next requesting enclave.

For example, if a software application program determines it requires an additional processor unit to complete its algorithm, it could send a message to the CPMC 22 to allocate one and connect it into the correct enclave. This process is invisible to the user, since additional subsystem resources 26 are allocated to the enclave by the application software, and the user or other programs are not aware that additional subsystem 26 resources have been assigned. Once the additional subsystem resource 26 is no longer needed by the enclave, the subsystem resource 26 is released and the CPMC sanitizes the subsystem resource 26. The subsystem resource 26 is then returned to the pool of available subsystem resources 26.

Another example could be that as the enclave is processing data, the enclave processor, through software, requests additional storage from the CPMC 22. The CPMC 22 receives the request and allocates an additional storage device to the enclave. When the enclave no longer requires the storage device, the CPMC 22 is notified and the device is released, sanitized and put back in the subsystem resource 26 pool. The allocation, releasing, sanitization and pool return of subsystem resources 26 is performed by the CPMC 22 function modules, as shown by FIG. 5.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A dynamic enclave computing system, comprising:
a physical layer switch;
a plurality of computing subsystem resources connected to the physical layer switch; and
a configuration policy manager and controller connected to the physical layer switch that manages and controls the physical layer switch,
wherein the plurality of computing subsystem resources includes at least one type of computing subsystem resource selected from the following: a network switch type computing subsystem resource, a storage device type computing subsystem resource, a display type computing subsystem resource and a guard type computing subsystem resource, and
wherein the configuration policy manager and controller is configured and arranged to be able to allocate the at least one type of computing subsystem resource to a requesting computing enclave via the physical layer switch, and
configured to monitor the enclave with the computing subsystem resource and instructing the physical layer switch to take control of the computing subsystem resource when the enclave no longer requires the computing subsystem resource via a release module of the configuration policy manager and controller computer device; and
configured to accept the computing subsystem resource from the release module, sanitizing the computing subsystem resource, and instructing the physical layer switch to return the computing subsystem resource to the resource pool via a sanitizer module of the configuration policy manager and controller computer device.

2. The system of claim 1, further including at least one computing enclave, wherein the computing enclave includes at least one of the computing subsystem resources.

3. The system of claim 2, wherein the at least one of the computing subsystem resources is a processor.

4. The system of claim 1, comprising a plurality of computing enclaves, each computing enclave includes at least one of the computing subsystem resources.

5. The system of claim 1, wherein the computing subsystem resources are connected to the physical layer switch by a wired connection or a wireless connection, and the configuration policy manager and controller is connected to the physical layer switch by a wired connection or a wireless connection.

6. The system of claim 1, wherein the computing subsystem resources are selected from the following: printers, displays, processors, network switches, storage devices, guards, scanners, servers, workstations, personal computers, and/or voice over IP systems.

7. The system of claim 1, wherein the plurality of computing subsystem resources includes a plurality of types of computing subsystem resources, each type of computing subsystem resource having a plurality of computing subsystem resources.

8. The system of claim 1, wherein the configuration policy manager and controller includes a plurality of function modules, the function modules comprise a resource availability module, an allocation module, a request module, a release module, and a sanitizer module.

9. The system of claim 8, wherein the resource availability module is configured to monitor and maintain the status of a processor by determining a class of the processor, a name of the processor, a state of the processor, whether the processor is allocated or free, and the location of the processor.

10. The system of claim 1, further comprising a non-computing subsystem resource connected to the physical layer switch, wherein the configuration policy manager and controller is configured and arranged to be able to allocate the non-computing subsystem resource to a requesting computing enclave via the physical layer switch.

11. The system of claim 1, wherein the physical layer switch is protocol independent and does not inspect incoming traffic or make routing decisions.

12. The system of claim 1, wherein the network switch type computing subsystem resource includes Ethernet switches, routers, hubs, repeaters, and network bridges.

13. The system of claim 1, wherein the storage device type computing subsystem resource includes random access memory, optical disks, floppy disks, USB flash drives, hard disk drives, magnetic tape, film, punch cards, and video tapes.

14. The system of claim 1, wherein the display type computing subsystem resource includes computer monitors, LCD monitors, plasma displays, television sets, light emitting diodes, video projectors, and lights.

15. The system of claim 1, wherein the guard type computing subsystem resource includes hardware guards, software guards, and combination of hardware and software guards.

16. The system of claim 1, wherein the plurality of computing subsystem resources includes a processor type of computing subsystem resources.

17. A method for dynamically allocating, releasing and isolating a plurality of computing subsystem resources, the method comprising:
connecting a plurality of computing subsystem resources to a physical layer switch, including at least one type of computing subsystem resource selected from the following: a network switch type computing subsystem resource, a storage device type computing subsystem resource, a display type computing subsystem resource and a guard type computing subsystem resource;

connecting a configuration policy manager and controller computing device to the physical layer switch;

maintaining, via a resource availability module of the configuration policy manager and controller computing device, a status of each of the plurality of computing subsystem resources;

analyzing and communicating, via a request module of the configuration policy manager and controller computing device, a request from an enclave for a computing subsystem resource of the plurality of computing subsystem resources included in a resource pool to the resource availability module of the configuration policy manager and controller computing device;

verifying whether the computing subsystem resource is as requested and instructing the physical layer switch to move the computing subsystem resource to the enclave via an allocation module of the configuration policy manager and controller computing device;

monitoring the enclave with the computing subsystem resource and instructing the physical layer switch to take control of the computing subsystem resource when the enclave no longer requires the computing subsystem resource via a release module of the configuration policy manager and controller computer device; and accepting the computing subsystem resource from the release module, sanitizing the computing subsystem resource, and instructing the physical layer switch to return the computing subsystem resource to the resource pool via a sanitizer module of the configuration policy manager and controller computer device.

18. The method of claim 17, further comprising creating a plurality of enclaves, each enclave including a plurality of computing subsystem resources allocated by the configuration policy manager and controller computer device.

19. The method of claim 18, comprising allocating a processor to one of the enclaves.

20. The method of claim 17, wherein the plurality of computing subsystem resources are connected to the physical layer switch by a wired connection or a wireless connection, and the configuration policy manager computer device and controller is connected to the physical layer switch by a wired connection or a wireless connection.

21. The method of claim 17, wherein the plurality of computing subsystem resources are selected from the following: printers, displays, processors, network switches, storage devices, guards, scanners, servers, workstations, personal computers, and/or voice over IP systems.

22. The method of claim 17, comprising a plurality of types of the computing subsystem resources, each type of computing subsystem resource having a plurality of computing subsystem resources.

23. The method of claim 17, wherein connecting the plurality of computing subsystem resources to the physical layer switch includes connecting a processor type computing subsystem resource to the physical layer switch.

24. A dynamic enclave computing system, comprising:

a protocol independent physical layer switch configured to not inspect incoming traffic and configured to not make routing decisions;

a resource pool that includes a plurality of unallocated computing subsystem resources, wherein each of the plurality of unallocated computing subsystem resources is connected to the physical layer switch;

a private area enclave that includes a plurality of private area computing subsystem resources, wherein each of the plurality of private area computing subsystem resources is connected to the physical layer switch; and a configuration policy manager and controller connected to the physical layer switch that manages and controls the physical layer switch, wherein the plurality of computing subsystem resources includes at least one of:

a processor type computing subsystem resource, a network switch type computing subsystem resource, a storage device type computing subsystem resource, a display type computing subsystem resource and a guard type computing subsystem resource, and wherein the configuration policy manager and controller is configured to allocate a processor type computing subsystem resource, a network switch type computing subsystem resource, a storage device type computing subsystem resource, a display type computing subsystem resource and a guard type computing subsystem resource to a requesting computing enclave via the physical layer switch, and configured to monitor the enclave with the computing subsystem resource and instructing the physical layer switch to take control of the computing subsystem resource when the enclave no longer requires the computing subsystem resource via a release module of the configuration policy manager and controller computer device; and configured to accept the computing subsystem resource from the release module, sanitizing the computing subsystem resource, and instructing the physical layer switch to return the computing subsystem resource to the resource pool via a sanitizer module of the configuration policy manager and controller computer device.

* * * * *